United States Patent [19]

Frey et al.

[11] Patent Number: 4,762,689

[45] Date of Patent: Aug. 9, 1988

[54] COMBINATION OF RETAINING MODULE AND CATALYST PLATES

[75] Inventors: Alfred Frey, Wattenheim; Daniel Grimm, Schlangenbad-Bärstadt; Hartmut Kainer, Wiesbaden, all of Fed. Rep. of Germany

[73] Assignee: Didier-Werke AG, Wiesbaden, Fed. Rep. of Germany

[21] Appl. No.: 930,315

[22] Filed: Nov. 12, 1986

[30] Foreign Application Priority Data

Nov. 11, 1985 [DE] Fed. Rep. of Germany ....... 3539887

[51] Int. Cl.$^4$ .................... A47G 29/00; B65D 85/42; B65D 85/48
[52] U.S. Cl. .................... 422/310; 422/311; 422/222; 206/334; 206/454; 206/455; 206/456; 211/40; 211/41; 211/45
[58] Field of Search ............. 422/310, 311, 222; 206/334, 454, 455, 456; 211/40, 41, 45

[56] References Cited

U.S. PATENT DOCUMENTS

| | | | |
|---|---|---|---|
| 1,192,299 | 7/1916 | Goebel | 211/40 |
| 2,338,290 | 1/1944 | McDonald | 211/41 |
| 2,572,355 | 10/1951 | Kintz | 211/41 |
| 3,271,626 | 9/1966 | Howrilka | 211/41 |
| 3,819,334 | 6/1974 | Yoshida et al. | |
| 4,002,381 | 1/1977 | Wagner et al. | 211/41 |
| 4,196,812 | 4/1980 | McInnis | 211/40 |
| 4,241,955 | 12/1980 | Armistead | 211/40 |
| 4,536,373 | 8/1985 | Jones, Jr. | 422/311 |
| 4,563,722 | 1/1986 | Maroney et al. | 211/41 |

FOREIGN PATENT DOCUMENTS

| | | | |
|---|---|---|---|
| 308038 | 3/1918 | Fed. Rep. of Germany | 422/310 |
| 2226344 | 12/1973 | Fed. Rep. of Germany | |

*Primary Examiner*—Barry S. Richman
*Assistant Examiner*—Lynn M. Kummert
*Attorney, Agent, or Firm*—Nils H. Ljungman

[57] ABSTRACT

A mounting frame for a block-type parallel mounting of catalyst plates is provided. The block mounting has frame members separated by a distance substantially corresponding to the width of the catalyst plates to be mounted. The frame members are provided with a series of guide slots open on top for admission of the catalyst plates. On the bottom edges of the frame members, there are provided base supports for the bottom edges of the catalyst plates. The frame members themselves also form lateral supports for the catalyst plates to prevent movement thereof when mounted in the module. The mounting modules, once loaded with the planar elements, can be combined into a larger frame in a horizontal mode, or they can be vertically stacked, such as in the flue of a combustion furnace itself. The plates are typically pre-coated with a material that is catalytic to further the conversion of the gaseous compounds passing thereby.

18 Claims, 6 Drawing Sheets

COMBINATION OF RETAINING MODULE AND CATALYST PLATES

BACKGROUND OF THE INVENTION

1. Field of the Invention

The invention relates to a mounting frame or module for a plurality of chemically-active planar elements which are spaced apart a discrete distance one from another and, more particularly to a mounting frame or module for a plurality of ceramic catalyst plates which are spaced apart a discrete distance one from another.

2. Description of the Prior Art

The prior art discloses box-like structures to hold catalyst plates in which the planar elements are guided and suspended by means of pins. However, such a system has proven incapable of providing for the precise guidance of the plates during insertion. So, it is not infrequent that fragile plates are broken during insertion into the box frame. Besides, loading of the box frame has been a tedious, time-consuming and expensive operation. The substantial weight of such prior art arrangement also represents a practical disadvantage.

OBJECTS OF THE INVENTION

A principal object of the invention is to provide a mounting frame which has an improved construction that can be safely and handily loaded.

Another object of the invention is to provide a mounting frame which protects the planar elements from damage while in the mounting frame.

Yet another object of the invention is to provide a plate mounting module adapted for plural stacking and protected against lateral shifting while in use.

SUMMARY OF THE INVENTION

The present invention achieves the foregoing objects by providing frame members that are positioned opposite one from another and being separated by the width of the catalytic plates. The frame members present a series of vertical guide slots at two top frame members, which slots are wholly traversible by the catalytic plates. The widths of the slots correspond essentially to the thickness of the inserted planar elements. There are two bottom frame members positioned below the top members. Base supports are provided on the bottom surface of the two bottom frame members for accommodating the lower edges of the chemical plates in the guide slots thereof. The frame members also serve to form lateral stops for the plates when they are disposed in the guide slots.

The mounting module taught here can be readily and safely loaded with the chemically-active elements or plates. The plates are inserted into the topmost guide slots, and are guided thereby and by the position of the lateral stops, until they come to rest on the lower supports. The plates are thus securely retained within the mounting members, without any mechanical stress being exerted upon them.

The mounting modules, once loaded with the planar elements, can be combined into a larger frame in a horizontal mode, or they can be vertically stacked, such as in the flue of a combustion furnace itself. The plates are typically pre-coated with a material that is catalytic in order to further the conversion of the gaseous compounds passing thereby.

DESCRIPTION OF THE PREFERRED EMBODIMENTS

The frame members are easy to manufacture. They are preferably made of a light weight thin metal. For this purpose, the frame member can be formed, preferably by bending sheet metal into a hollow body. The plate guide slots are formed by perforations made in the sheet metal, and the planar elements stops and supports are formed in the sheet metal itself. The frame members are preferably mounted on imperforate end walls.

Figure 1:
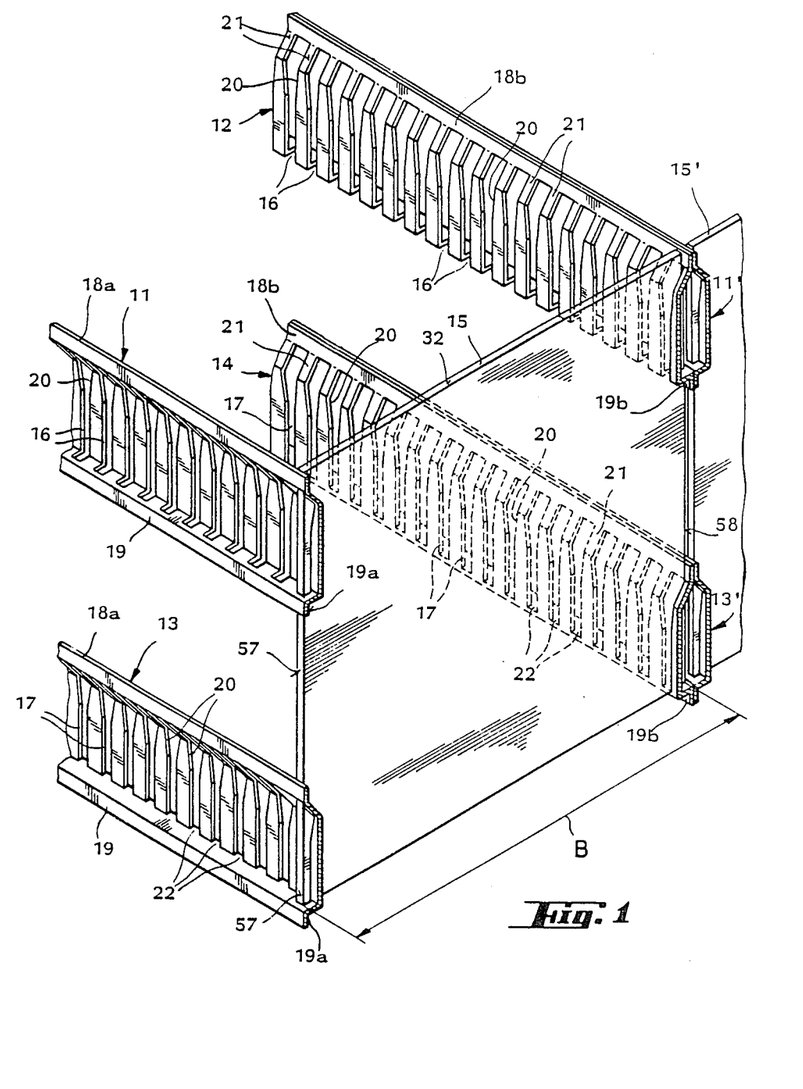
FIG. 1 is a perspective view of a first embodiment of the present invention, omitting for clarity all but one of the planar elements.

A typical mounting module exhibits two upper frame members 11 and 12 and two lower frame members 13 and 14. The upper and lower frame members are spaced apart at an interval which corresponds closely to the horizontal width of planar elements 15. Four of such frames are shown in FIG. 1. A plurality of parallel guide slots 16 are provided in the upper frame members 11 and 12. Similar guide slots 17 are provided in the lower frame members 13 and 14. The guide slots 16 of the upper frame members are preferably in vertical alignment with the guide slots 17 of the lower frame members. The guide slots of both frame members preferably project inwardly from the mounting frame itself, with their opposing slotted faces being spaced apart a distance preferably somewhat less than the width of the planar elements to be accommodated, as will be described.

Each of the frame members 11 to 14 are conveniently formed of sheet metal, in which the guide slots 16 and 17 have been punched, or cut, out before the sheet metal is formed to the desired configuration. The central (right-side) frame members 12 and 14 have an end profile which is approximately that of a letter U, terminating at the upper and lower ends by horizontal closing elements 18b and 19b, respectively. An inclined and converging surface 21 is provided on both sides of the frame members which converges to form the upper end or portion of horizontal elements 12 and 14 being fitted under closures 18b. For the upper frame members 11 and 12, the vertical guide slot 16 extends over a substantial portion of the entire depth of the U-profile, so that the slots 16 are traversible from top to bottom in order to slidingly admit catalyst plates 15.

On the lower frame members 13 and 14, the guide slots 17 do not penetrate the outwardly flanged base portion 19 adjacent the lower closing element 19b. The base forms an arresting surface base 22 which supports the lower edges of the planar elements. Both sets of the guide slots 16 and 17, have their parallel slots tapering outwardly from the slot middle to the slot top, forming a funnel opening 20, thus permitting the ready insertion of the planar elements into the module.

Horizontal retaining strips 18a and 18b are respectively disposed on the upper frame members 11 and 12, and similar strips 18a and 18b are respectively disposed on the lower frame members 13 and 14. Strip 19a and 19b extend from the retaining base 22. These strips 18a, 18b, 19a and 19b are employed to maintain the shape of the frame members. At the same time, these strips form lateral stops to keep the planar elements 15 in place. They can also be used to attach the frame members in a surrounding sheet metal box, as will be described in relation to FIG. 3.

Figure 2:
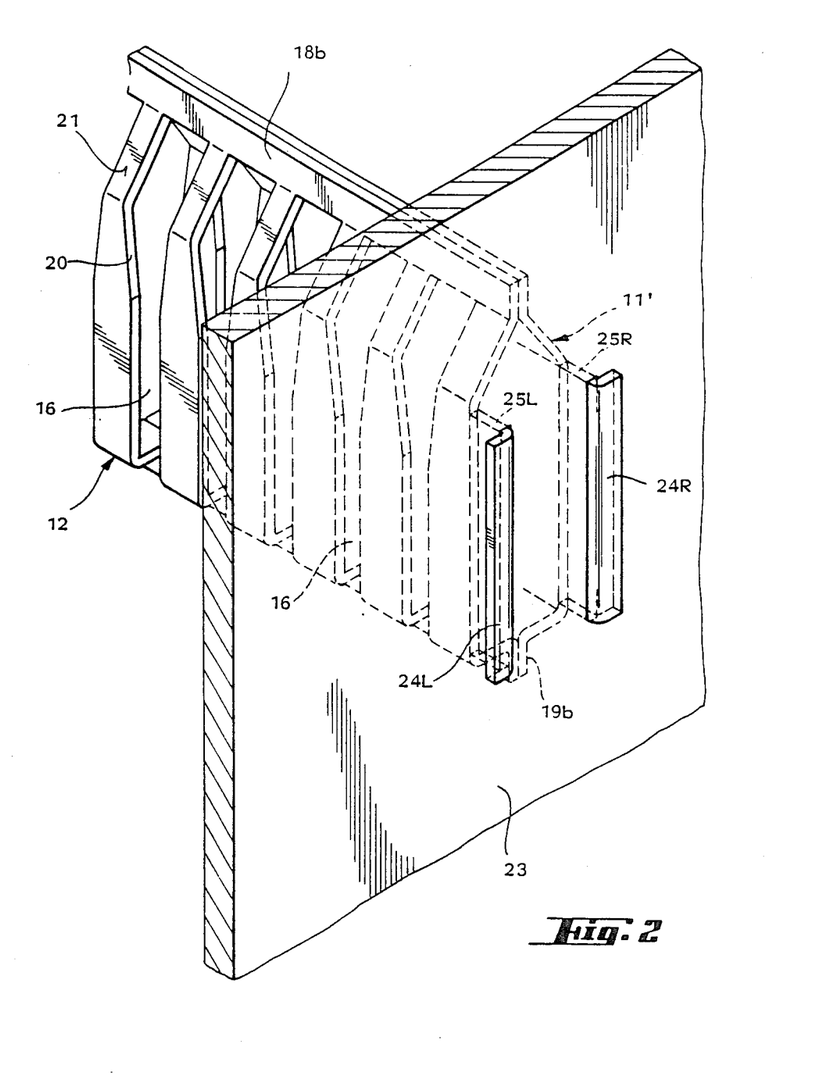
FIG. 2 is an enlarged, cut-away portion of the central portion of FIG. 1, partially in phantom, showing one means of fastening the frame members to the supporting end walls.

In the embodiment illustrated in FIGS. 1 and 2, the upper frame members 11 and 12 and the lower frame members 13 (FIG. 1) and 14, are connected by an end wall 23 (FIG. 2) with corresponding symmetrical other sets of frame members 11' and 13'. For this purpose, the retainer strips 18a and 18b and bases 19a and 19b can be spot welded. It thereby becomes possible to insert another block of planar elements 15' (as shown in FIG. 1), perhaps of differing dimensions, into the same mounting module without resorting to a horizontal partition (not shown).

In the embodiment shown in FIG. 2, the frame member 12 terminates with left and right angled tabs 24L and 24R, respectively, which tabs are inserted and bent back through slit-like openings 25L and 25R provided in a sheet metal side wall 23. If necessary, the positioned tabs can be spot welded to the outside of the side wall 23. The anchoring of the side wall 23 thereby ensures that the required distance is maintained between the frame members.

Figure 3:
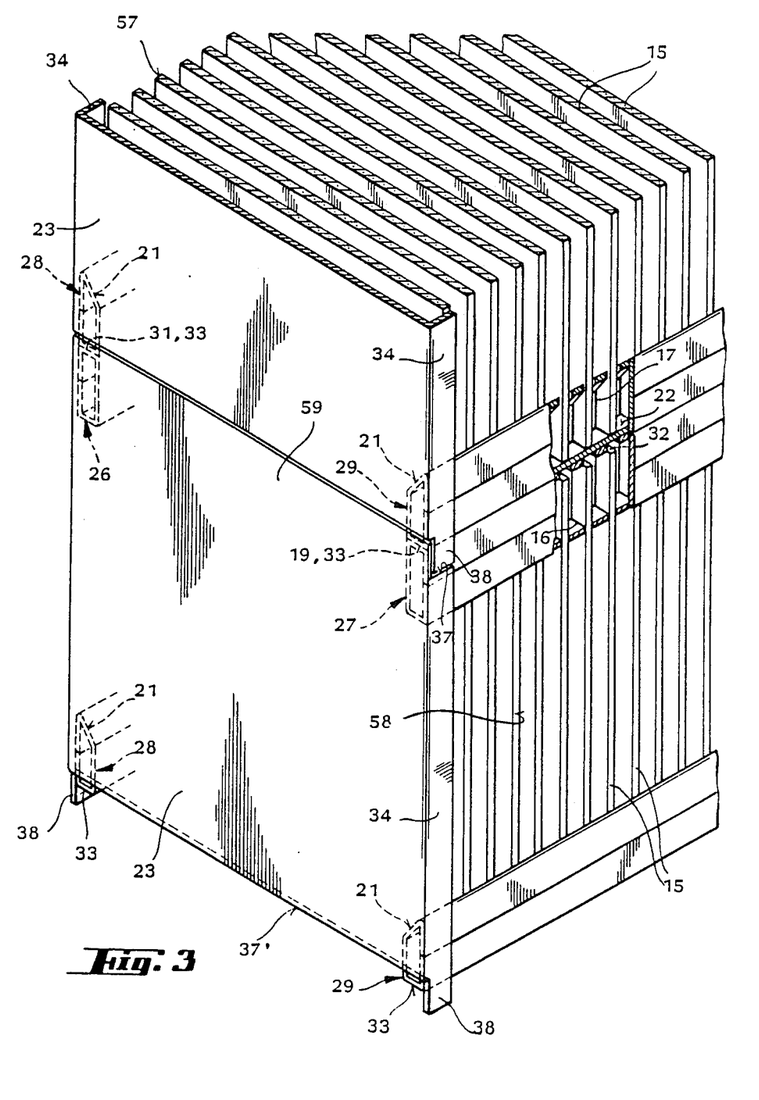
FIG. 3 is a perspective view, partially broken away, with a lower mounting module shown, having another mounting module stacked on top, also depicting another cross-sectional configuration for the frame members.
Figure 4:
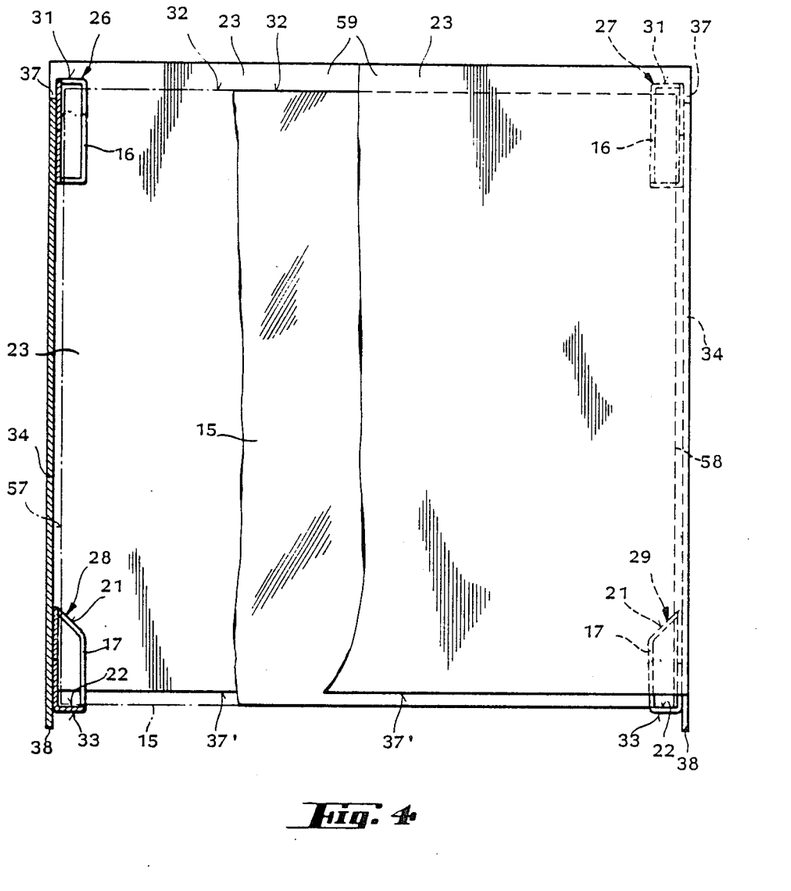
FIG. 4 is an elevational side view of the lower mounting module of FIG. 3, partially in phantom, with the end wall omitted for clarity.

In the alternate embodiment illustrated in FIGS. 3 and 4, upper frame members 26 and 27 and lower frame members 28 and 29, are also formed of bent sheet metal pieces. The slot-bearing frame pieces define a plane that is parallel to the longitudinal axis of the frame pieces. These frame pieces have an inward curvature toward the inside of the module unit. The longitudinal plane is also perpendicular to the surface of the planar elements 15. The positions of the frame members are determined by the height and width B of FIG. 1. The frame members 26 to 29 are shown as formed from tubular bodies with high structural integrity. Their vertical guide slots (not seen) are conveniently formed as was described in connection with FIGS. 1 and 2.

Each of the upper frame members 26 and 27 presents a horizontal upper surface 31, which extends slightly above an upper horizontal edge 32 of the planar elements 15 (FIG. 4). On lower frame members 28 and 29, there is a horizontal lower surface 33, which simultaneously forms a support base 22 for the plates 15. Side walls 23, typically of sheet metal, are integrally connected to the frame members 26 to 29 at both of their ends (as shown in FIG. 3). The frame members are engaged by means of a vertical support strip or lip 34. The strip 34 wraps around and overlaps the outer ends of said frame members. The strip 34 also has a downwardly extending tab 38, which engages a corresponding upper recess 37 of the lower end.

In this manner, two mounting modules can be stacked rigidly, one on top of the other (see FIG. 3). The lower horizontal surface 33 of the lower mounting frame members 28 and 29 is therefore placed in firm contact with an upper horizontal surface 31 of the upper frame members 26 and 27 which are made of metal. The extension tab 38 of an upper mounting module is engaged in the recess 37 of the lower mounting module. Consequently, no mechanical load is thereby exerted on the catalyst plates once loaded in an operating position.

Figure 5:
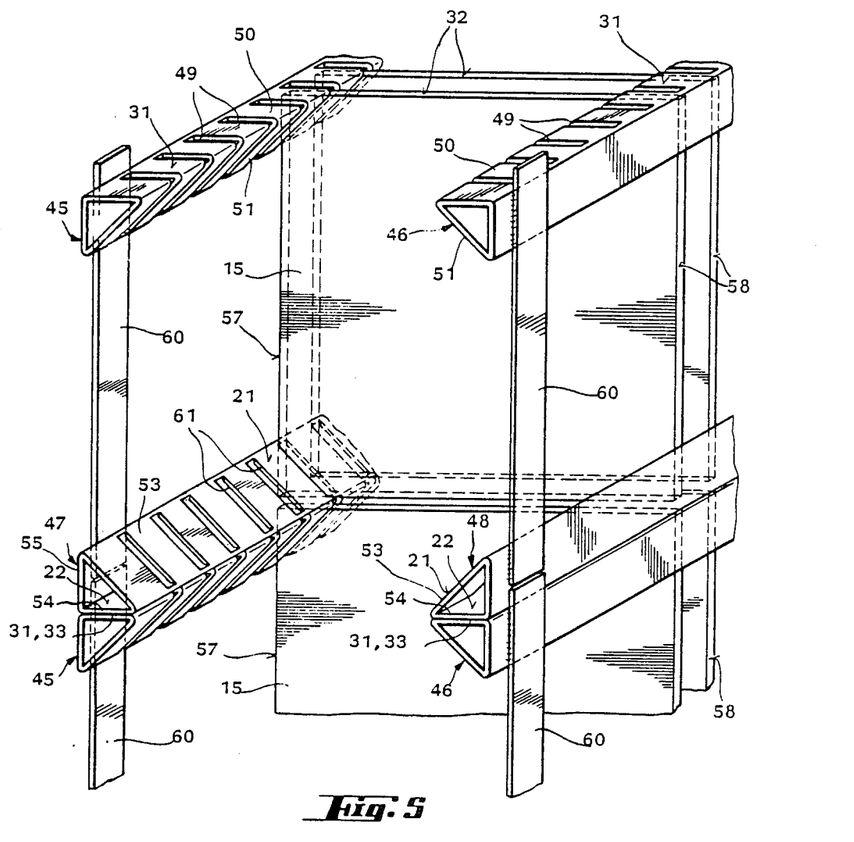
FIG. 5 is a perspective view of another embodiment of the frame members in an assembled mounting module, with one of the modules stacked one on top of another module, partially broken away.
Figure 6:
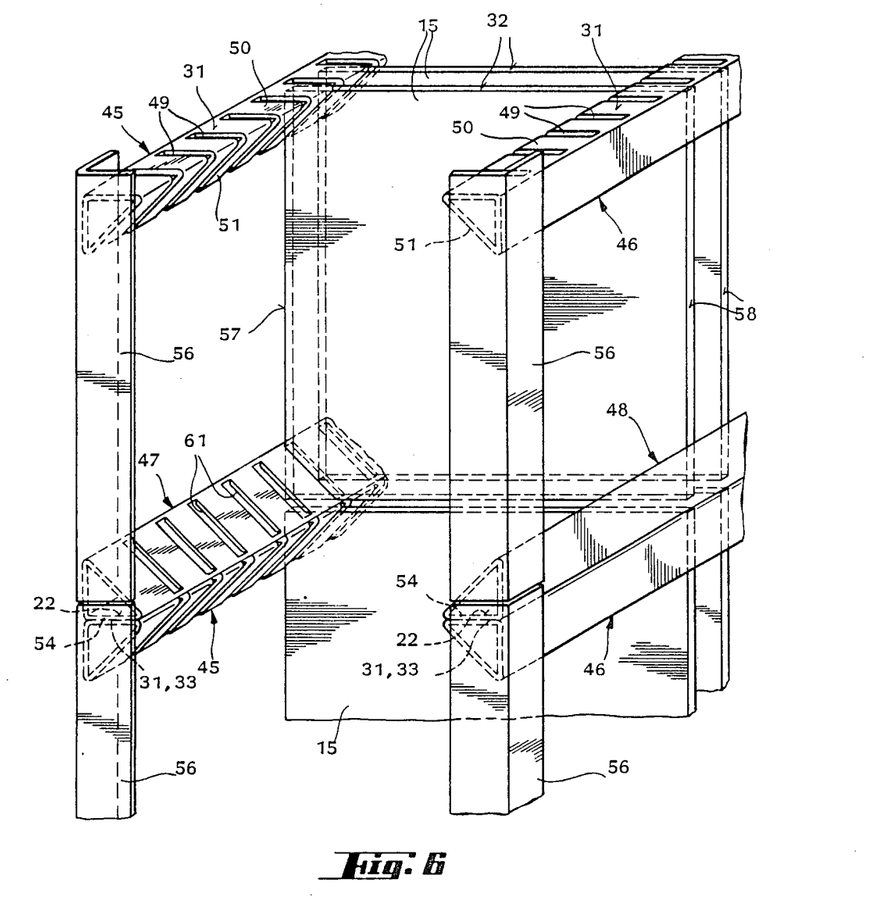
FIG. 6 is a perspective view of another mounting module assembly, partially broken away, according to another embodiment of the invention, relating to the means for frame fastening.

In the alternate embodiment illustrated in FIGS. 5 and 6, upper frame members 45 and 46, and opposing lower frame members 47 and 48, are fabricated as hollow bodies, conveniently having the cross section of a right triangle. In the upper frame members 45 and 46, a plurality of parallel guide slots 49 extend substantially back into both of the horizontal and inclined surfaces 50 and 51 of members 45 and 46.

In lower tubular frame members 47 and 48, there are also inwardly disposed guide slots 61, but they are located only in an inclined triangle surface side 53. The lowermost and vertical surfaces 54 and 55 of triangular sides of members 47 and 48 serve as arresting supports for the catalyst elements 15.

Also, as depicted in FIG. 5, the tubular frame members 47 and 48 (46 in the upper module 15), and members 45 and 46 in the lower module, are held externally in each corner to one another by vertical, rigid strips or brackets 60. By virtue of their being offset from the horizontal edges of the members 46 and 48, this assures that the mounting modules can be rigidly stacked, thus avoiding horizontal shifting.

In the embodiment illustrated in FIG. 6, a right angle, iron type of rigid, vertical bracket 56 is employed, instead of the flat strip brackets 60 of FIG. 5, to maintain the horizontal tubular members in fixed, spaced apart relationship.

In each of the embodiments shown in FIGS. 1, 3, 4 and 5, the chemically-active planar elements 15 are guided.

As shown in FIG. 5, the planar elements 15 are guided along their two opposing vertical edges 57 and 58 by upper and lower frame members 45 to 48. As shown in FIG. 1, a plurality of the guide slots 16 and 17 are in contact along their vertical edges with the planar element surfaces. The slot height and width is determined by the dimensions of the plates so that reliable guidance is assured.

The plate mounting modules as described above, specifically as to their frame members, are lightweight, simple to manufacture and exhibit good dimensional stability. The mounting modules can be readily automatically loaded, by introducing the planar elements 15 from above into the guide slots 16 and 17, until they rest on base supports 22. The frame members simultaneously act as lateral stops for the loaded planar elements.

The rigid plates, once inserted, are securely retained. Each planar element 15 is individually supported, without any mechanical load being applied to it indirectly by the other adjacent planar elements, or by the mounting module.

After the plates have been loaded into the mounting module, each loaded mounting module may be stacked into larger catalyst units. As shown in FIG. 3, to ensure the rigidity of the stacked mounting modules in both directions, the metal side wall 23 itself, in addition to the role of the tabular projections 38, and the opposing complimentary recess 37, provides another lengthwise upward projection 59. This projection 59 extends beyond the member upper surface 31 (FIG. 4) to overlap part of the upper tubular members 26 and 27. There is provided a corresponding recess 37' along the lower edge of the side wall 23 (see FIGS. 3 and 4).

Numerous other embodiments fall within the scope of the present invention. For example, individual features of the embodiments described above can be usefully combined. In the embodiments illustrated in FIGS. 5 and 6, the means of support for the metal side walls which retain the frame members at their ends at the correct intervals, are not shown. They can be readily constructed as described with reference to the embodiments of FIGS. 1 to 4.

The invention as described hereinabove in the context of the preferred embodiments is not to be taken as limited to all of the provided details thereof, since modifications and variations thereof may be made without departing from the spirit and scope of the invention.

What is claimed is:

1. A retaining module containing and in combination with catalyst plates, said retaining module receiving and detachably retaining a plurality of substantially planar catalyst plates, said plates having a given thickness, said retaining module comprising:
    four receiving members receiving and holding said catalyst plates in an array;
    a pair of side walls which are secured to opposing ends of each of said receiving members;
    said receiving members comprising:
    a first and upper pair comprising a first set of said receiving members, said first pair of upper receiving members having substantially parallel slots spaced apart and each sized to admit in sliding engagement said catalyst plates, and to maintain them spaced apart from one another;
    a second and lower pair of said receiving members having a second set of substantially parallel slots sized to admit in sliding engagement said plates while maintaining said plates spaced apart;
    said lower pair providing along their lower end, a flange which comprises an arresting base for lower portions of said catalyst plates, said slots having a slot width substantially similar to said thickness of said catalyst plates;
    a first of said upper receiving members being aligned substantially directly above a first of said lower receiving members;
    a second of said upper receiving members being aligned substantially directly above a second of said lower receiving members;
    said parallel slots of said first and second of said upper receiving members being disposed in relation to said slots of said first and second of said lower receiving members for receiving in each aligned slot one of said plates;
    means for retaining said plates in said slots and for substantially preventing sidewise movement of said plates;
    means for retaining said receiving members disposedly aligned to one another;
    said module, with the catalyst plates disposed therein, being substantially open at its top and bottom ends and on the sides between said side walls;
    said catalyst plates forming substantially unobstructed elongated spaces thereinbetween;
    said retaining module comprising a first module; and
    means for aligning at least one additional module with said first module and for aligning catalyst plates in the at least one additional module with said catalyst plates in said first module to provide substantially unobstructed alignment of spaces between the substantially aligned catalyst plates of the at least one additional module and the spaces between the catalyst plates of said first module for permitting a substantially unobstructed flow of gases in said substantially unobstructed and aligned spaces of said first module and the at least one additional module.

2. A retaining module containing and in combination with catalyst plates, said retaining module receiving and detachably retaining a plurality of substantially planar catalyst plates, said plates having a given thickness, said retaining module with catalyst plates comprising:
    four receiving members receiving and holding said catalyst plates in an array;
    a pair of side walls which are secured to opposing ends of each of said receiving members;
    said receiving members comprising:
    a first and upper pair comprising a first set of said receiving members, said first pair of upper receiving members having substantially parallel slots spaced apart and each sized to admit, in sliding engagement, said catalyst plates, and to maintain them spaced apart from one another;
    a second and lower pair of said receiving members having a second set of substantially parallel slots sized to admit, in sliding engagement, said plates while maintaining said plates spaced apart;
    said lower pair providing along their lower end, a flange which comprises an arresting base for lower portions of said catalyst plates, said slots having a slot width substantially similar to said thickness of said catalyst plates;
    a first of said upper receiving members being aligned substantially directly above a first of said lower receiving members;
    a second of said upper receiving members being aligned substantially directly above a second of said lower receiving members;
    said parallel slots of said first and second of said upper receiving members being disposed in relation to said slots of said first and second of said lower receiving members for receiving in each aligned slot one of said plates;
    means for retaining said plates in said slots and for substantially preventing sidewise movement of said plates;
    means for retaining said receiving members disposedly aligned to one another;
    said four receiving members and said side walls forming a frame of said module;
    said module having a top and bottom and two sides between said side walls;
    said module, with the catalyst plates disposed therein, being substantially open, between said four receiving members, at its top and bottom ends and on both of the sides between said side walls;
    said catalyst plates forming substantially unobstructed spaces thereinbetween;
    said spaces being elongated;
    said catalyst plates defining said spaces as planar spaces between said catalyst plates; and
    said planar spaces being disposed to permit a substantially unobstructed flow of gases in said planar spaces at least between said top and bottom and between the sides of the module along said planar spaces.

3. The combination according to claim 2 wherein said slots in both of said upper and lower pairs of said receiving members are parallel to one another, said parallel slots serve to define a configuration holding parallel sides of said catalyst plates, said slots having slot bottoms and slot tops, said slots being at least partially tapered outwardly from said slot bottoms to said slot tops thereby permitting ready insertion of said catalyst plates into said module.

4. The combination according to claim 2 wherein a rigid strip lies secured adjacent each end of said vertically aligned receiving members, said rigid strip being of essentially the same height as said side walls, but offset from complete coincidence therewith, so as to define a protruding tab at one horizontal edge of said side walls and also to define a peripheral recess at the other horizontal edge of said side walls.

5. The combination according to claim 2 wherein said receiving members are fabricated from sheet metal, said slots are formed by cut-outs made in said sheet metal, and each said arresting base is formed in said sheet metal.

6. The combination according to claim 2 wherein said receiving members each have a longitudinal axis and said slots are formed by projections from said receiving members, said projections at their tips define a plane that is aligned parallel to the longitudinal axis of said receiving members and said plane is perpendicular to surfaces of the said catalyst plates.

7. The combination according to claim 2 wherein in said upper pair of said receiving members, an uppermost horizontal surface of each of said upper receiving members extends somewhat above an upper horizontal edge of a retained catalyst plate, a lower horizontal surface of said lower pair of said receiving members providing said arresting base.

8. The combination according to claim 2 wherein parallel edges of said slots are substantially vertical and provide lateral support for surfaces of said catalyst plates while said arresting base of said lower receiving member partially contacts peripheral lower edge corners of said catalyst plates.

9. The combination according to claim 2 wherein said slots are wider at upper portions thereof than at lower portions thereof.

10. The combination according to claim 2 wherein said receiving members and said retaining means are connected to define a box structure containing said catalyst plates.

11. The combination according to claim 2 wherein each of said receiving members has a strip at an upper portion thereof for limiting sidewise movement of said catalyst plates.

12. The combination according to claim 2 wherein said receiving members comprise rigid hollow bodies.

13. The combination according to claim 12 wherein said hollow bodies have a triangular cross-section.

14. The combination according to claim 12 wherein said hollow bodies have a rectangular cross-section.

15. The combination according to claim 12 wherein said hollow bodies are U-shaped.

16. The combination according to claim 2 wherein said receiving members are spaced apart laterally at a distance substantially equivalent to the width of said planar elements and wherein said retaining means comprises end walls and the ends of said receiving members are secured at opposing ones thereof to said side walls to maintain said spacing.

17. The combination according to claim 16 wherein said end walls have slit-like perforations and each end of said receiving members is provided with outwardly turned rectangular flanges which pass through complemental slit-like perforations in the end walls to secure said receiving members to said end walls.

18. The combination according to claim 17 wherein said module is stackable upon a second similar module and wherein said module has a downwardly extending first tabular strip projecting from the lower edge of and the inner surface of the end wall on a first module and is adapted to overlap with an upwardly extending second tabular strip on the upper edge and outer surface of the end wall of the second module, said first and second strips being adapted to thus provide lateral arrest for the modules when they are stacked one upon the other.

* * * * *